United States Patent
Gevargiz et al.

(10) Patent No.: US 6,301,313 B1
(45) Date of Patent: Oct. 9, 2001

(54) MOBILE DIGITAL RADIO SYSTEM WITH SPATIAL AND TIME DIVERSITY CAPABILITY

(75) Inventors: John M. Gevargiz, Marina Del Rey; David J. Bell, La Crescenta; Faramaz Davarian, Los Angeles, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/184,444

(22) Filed: Nov. 2, 1998

(51) Int. Cl.$^7$ .................................................. H04B 7/185
(52) U.S. Cl. .................... 375/340; 375/347; 375/350; 370/321; 370/326; 455/3.2; 455/13.1
(58) Field of Search ..................... 375/144, 148, 375/211, 347, 349; 370/316, 321, 324, 326, 335–337; 455/3.2, 12.1, 13.1, 13.2

(56) References Cited

U.S. PATENT DOCUMENTS 5,835,487 * 11/1998 Campanella ...................... 370/316
5,864,579 * 1/1999 Briskman ........................... 375/200

OTHER PUBLICATIONS

Bell, Gevargiz, Vaisnys, Julian, "Overview of Techniques for Mitigation of Fading and Shadowing in the Direct Broadcast Satellite Radio Environment", International Mobile Satellite Conference, Ottawa—IMSC 1995, pp. 423–444.

J. Gevargiz, et al., "Performance of DBS–Radio Using Concatenated Coding and Equalization", International Mobile Staellite Conference, Ottawa—IMSC 1995, pp. 445–450.

* cited by examiner

Primary Examiner—Amanda T. Le
(74) Attorney, Agent, or Firm—Vijayalakshmi D. Duraiswamy; Michael W. Sales

(57) ABSTRACT

An improved mobile digital radio system is disclosed. A plurality of satellites and terrestrial repeaters transmit substantially identical information that is contained in an original time division multiplexed data stream. Each satellite transmits on a separate frequency band, and all terrestrial repeaters transmit on one shared frequency band. A mobile receiver simultaneously processes the frequency bands. The receiver selectively parses and concatenates a plurality of time division multiplexed data streams to substantially recompose the original data stream. The output may be a high fidelity audio signal, data for display, or a combination of audio and displayed data.

7 Claims, 7 Drawing Sheets

MOBILE DIGITAL RADIO SYSTEM WITH SPATIAL AND TIME DIVERSITY CAPABILITY

BACKGROUND OF THE INVENTION (a) Field of the Invention

The present invention relates generally to an improved mobile digital radio system. More particularly, it relates to an improved mobile digital radio system wherein a plurality of satellites and terrestrial repeaters transmit identical information on separate frequency bands to a mobile receiver that processes the frequency bands to produce a single high quality output signal.

(b) Description of Related Art

Practical power limitations of transmission sources and signal propagation impairments can substantially reduce the quality of digital radio frequency transmissions. Such signal degradation is particularly troublesome for mobile receiver applications because the nature and severity of the signal corruption changes unpredictably as the mobile receiver unit moves within the operating environment.

One method of improving the mobile reception of digital radio frequency transmissions uses signal source spatial diversity in conjunction with a signal source selection scheme. With this method, a plurality of spatially diverse signal sources simultaneously transmit identical information on different frequency bands. A mobile receiver unit simultaneously monitors the signal quality of all the frequency bands, and selects the highest quality signal as its output. Thus, if one signal source becomes seriously impaired or blocked as the mobile receiver moves through the operating environment, the receiver will compose its output signal using another unpaired signal source transmitting identical information.

Another method of improving the mobile reception of digital radio frequency transmissions uses signal source temporal diversity in conjunction with a signal correction scheme. With this method, a plurality of temporally diverse signal sources transmit identical information on different frequency bands. Typically, two frequency bands transmitting identical information are used wherein one frequency band transmits with a time delay of several seconds relative to the other frequency band. Alternatively, a signal and its delayed copy can be time division multiplexed onto a single frequency band. A mobile receiver ordinarily uses the delayed signal for its output, and stores in memory a moving window of data from the leading signal equal to the relative time delay. Thus, if the delayed signal source becomes seriously impaired or blocked as the mobile receiver moves through the operating environment, the receiver will recompose its output signal using leading signal data retrieved from memory.

There is a growing industry trend and consumer demand for improved quality in mobile data and audio services. For example, automotive digital radio, Satellite Digital Audio Services (S-DARS), and satellite broadcast data services are promising markets. Mobile digital audio presents the most difficult challenge, though, because its viability depends on superior service coverage and output signal fidelity. Music in, particular, is extremely challenging because the human ear can perceive even the smallest distortions in music as objectionable.

Existing mobile digital radio systems cannot produce the signal fidelity needed for high quality digital audio. Satellite based systems cannot achieve the needed spatial diversity of transmissions. Although satellite transmissions of digital radio signals can be economically dispersed over wide geographic areas, numerous coverage gaps are created in urban areas by trees, buildings, and other structures. As a result, mobile satellite users will frequently experience signal fading and loss as they travel through urban areas. Furthermore, increasing satellite power margin to penetrate buildings and to overcome common shawdowing effects would be cost prohibitive. Existing terrestrial digital radio systems are also inadequate. Terrestrial systems suffer from multi-path effects such as signal fading and signal cancellation, and they are cost prohibitive in rural areas where the population is sparse.

Consequently, a need exists for an improved mobile digital radio system. More specifically, there is a need for a system that can economically provide superior service coverage, and that can produce a high quality audio output.

SUMMARY OF THE INVENTION

In accordance with one aspect of the present invention, a mobile digital radio system comprises a plurality of satellites and terrestrial repeaters that are transmitting substantially identical information on separate frequency bands. Each satellite transmits on a separate frequency band and all terrestrial repeaters transmit on a single shared frequency band. A mobile receiver simultaneously processes the frequency bands, and selectively parses and concatenates the information they contain to substantially recompose a digital data stream.

In accordance with another aspect of the present invention, a mobile digital radio receiver comprises a signal processor that simultaneously receives information transmitted by a plurality of satellites and terrestrial repeaters. The receiver selectively parses and concatenates the information to substantially recompose a digital data stream. The receiver may further include: an adaptive demodulator, a data synchronizer, a data word error flag processor, a data channel switch, and a time diversity processor.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
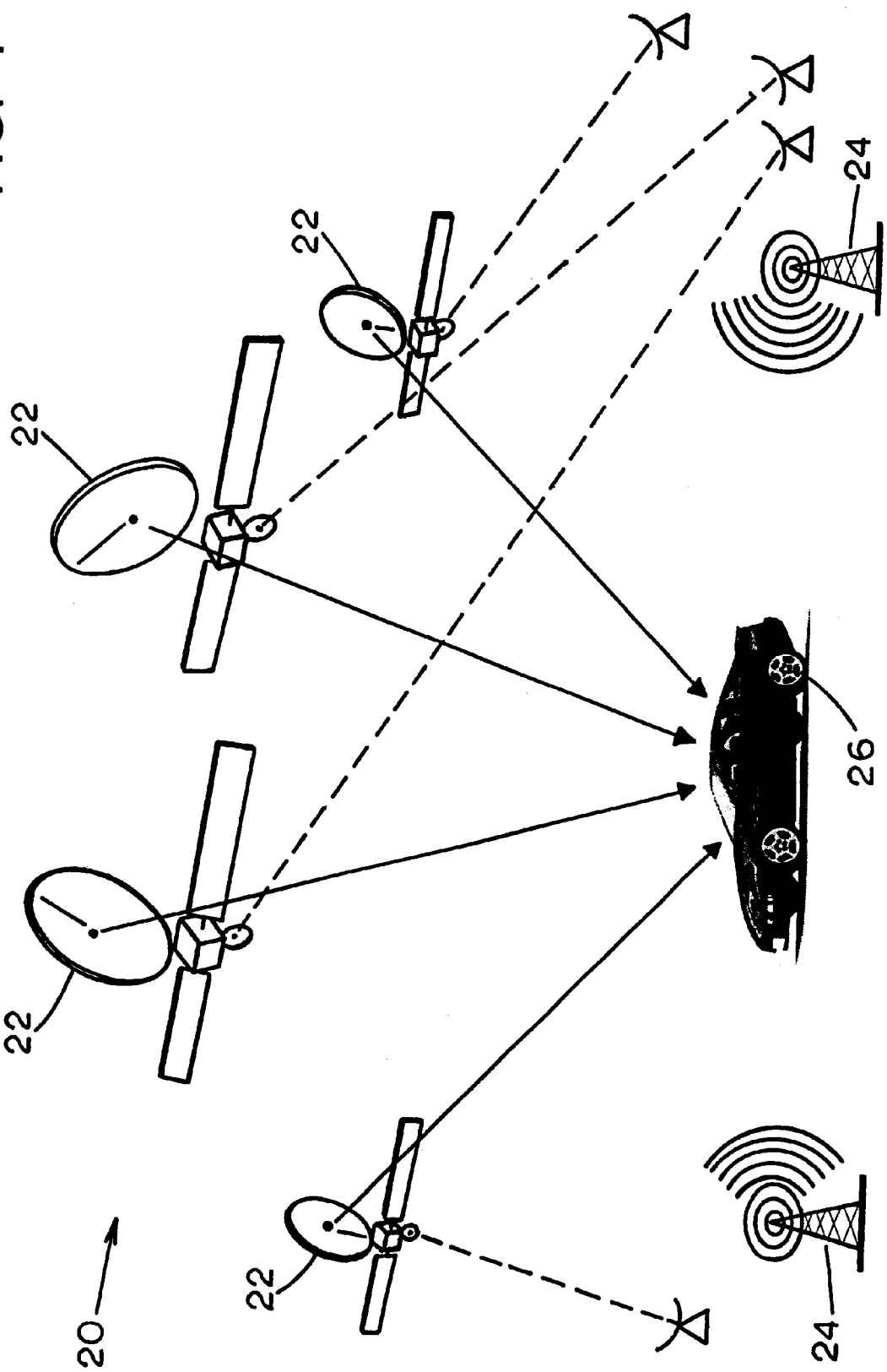
FIG. 1 is a system level diagram of the proposed improved mobile digital radio system.

Illustrated in FIG. 1 is an improved mobile digital radio system 20 that transmits digital radio signals to a mobile diversity receiver 26. The digital radio system 20 is preferably comprised of four satellites 227 and a plurality of terrestrial or ground-based signal repeaters 24. Each of the four satellites 22 transmits substantially identical information using a unique frequency band. The power margin of the satellite transmissions is approximately 10 dB. Two satellites are preferably in geosynchronous earth orbit and the two remaining satellites are in a high earth orbit or alternatively a medium earth orbit. Various combinations of satellite earth orbits may be selected to ensure a large signal path angle diversity and good service coverage in both high and low latitude regions. More or fewer satellites and frequency bands may be used in various combinations to achieve a desired signal quality, service coverage, and system cost. The repeaters 24 transmit information substantially identical to that transmitted by the satellites 22 on a fifth frequency band. Thus, there are a total of five unique frequency bands so that each satellite 22 has a unique band, all terrestrial repeaters 24 share one band, and the information transmitted on all frequency bands is substantially the same. The improved digital radio system 20 thereby provides broad geographic coverage using satellites, and fills terrestrial signal coverage gaps caused by trees, buildings, and other signal propagation impairments using terrestrial repeaters 24.

Figure 2:
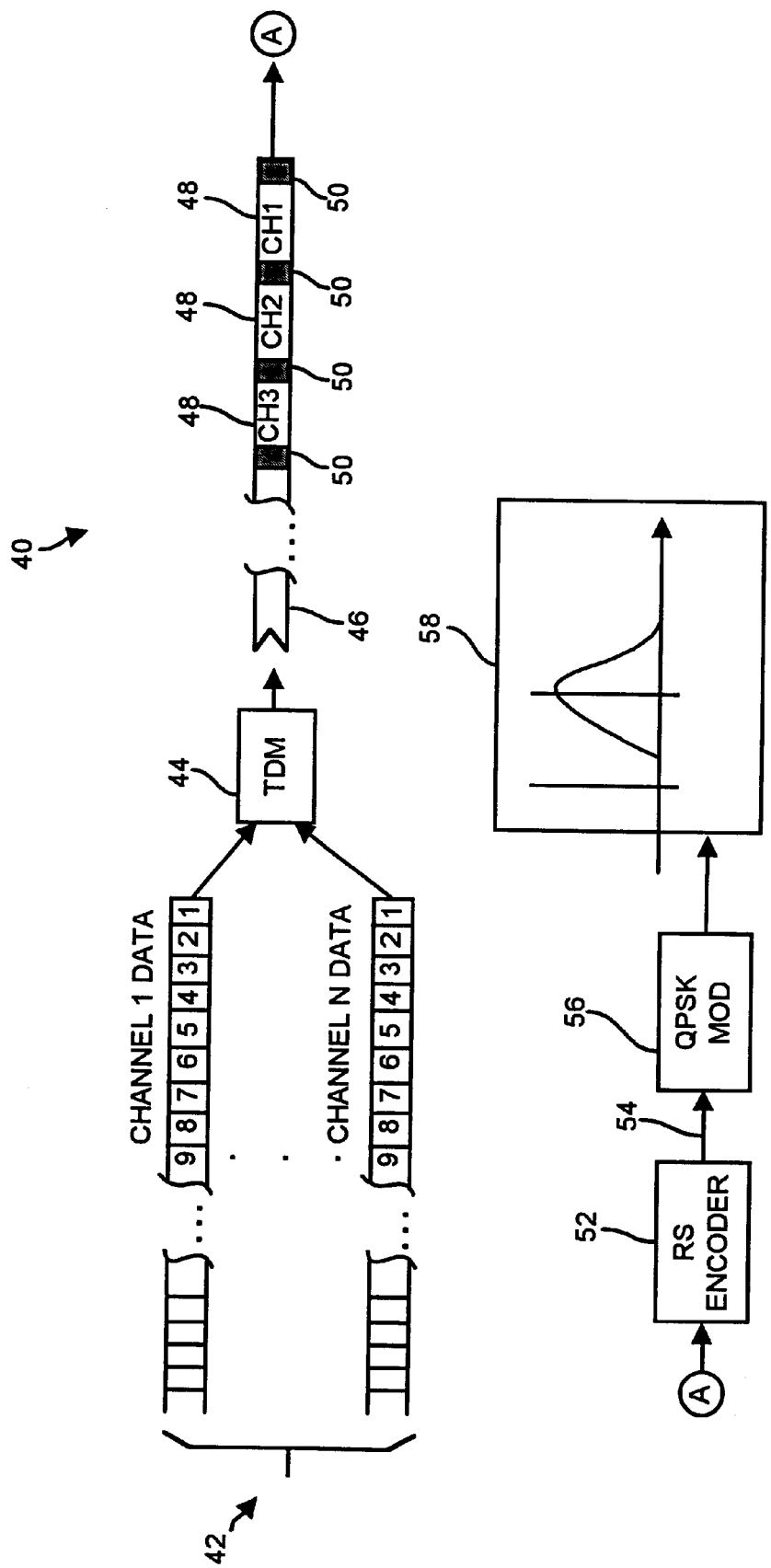
FIG. 2 is a block diagram depicting the preferred method of signal formation for the proposed digital radio system.

Depicted in FIG. 2 is a diagram representing a preferred method 40 of signal formation for the improved digital radio system of the present invention. A plurality of data channels 42 are sequentially parsed by a time division multiplexer (TDM) 44 and concatenated into a data stream 46. The data words 48 are seperated by marker, timing, or synchronization bits 50. The marker bits 50 facilitate a later decommutation and temporal alignment of the individual data channels 42. The marker bits 50 may also be used to synchronize de-interleavers and decoders, train equilizer functions, or to resolve I/Q (in-phase/quadrature phase) ambiguity during signal aquisition. The data stream 46 passes through a Reed-Solomon encoder 52 and becomes an encoded data stream 54. Alternatively, the encoder 52 could use a standard convolutional encoding, or a variety of other digital data encoding techniques.

A quadrature phase shift key modulator (QPSK) 56 modulates the encoded data stream 54 and transmits it on a predetermined frequency band 58. Alternative modulation schemes such as coded orthogonal frequency division multiplexing (COFDM), amplitude shift keying (ASK), frequency shift keying (FSK), binary phase shift keying (BPSK), differential phase shift keying (DPSK), or quadrature amplitude modulation (QAM) may be employed to accomplish a similar result. The encoded data stream 54 can similarly be applied to a plurality of QPSK modulators designed to transmit on separate frequency bands. Thus, the signal formation method 40 can be used to time division multiplex a plurality of independent data channels into one encoded data stream, and then simultaneouly transmit this encoded data stream on a pluality of frequency bands.

Figure 3:
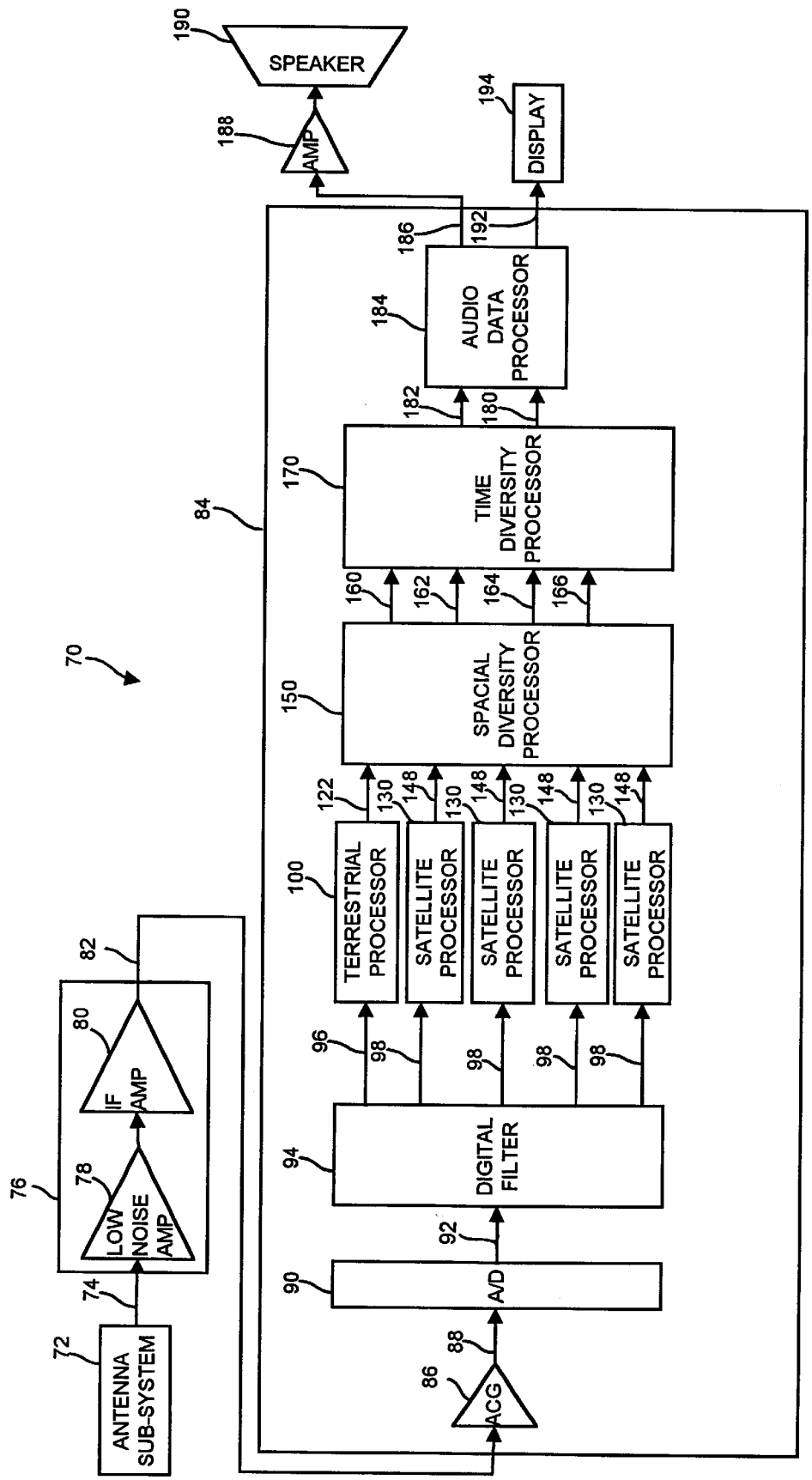
FIG. 3 is a block diagram of the proposed improved mobile diversity radio receiver.

Illustrated in FIG. 3 is a block diagram of an improved mobile diversity receiver 70. An antenna sub-system 72 receives a combined spectrum signal that includes the five frequency bands used by the transmission system 20 of FIG. 1. The antenna sub-system 72 provides an output signal 74 to an analog signal processor 76. The analog signal processor 76 comprises a low-noise radio frequency amplifier 78, and an intermediate frequency amplifier or radio frequency down convertor 80. Output signals from the antenna sub-system 72 are amplified by the low-noise amplifier 78 and then applied to the intermediate frequency amplifier 80. The intermediate frequency amplifier 80 uses a hetrodyne technique to substantially down convert or reduce the nominal frequency of the amplified antenna signal.

A reduced frequency, amplified antenna signal 82 is applied to the input of a digital processor 84. The digital processor 84 comprises an automatic gain controlled amplifier 86, an analog to digital converter 90, a digital filter 94, a terrestrial signal sub-processor 100, four satellite signal sub-processors 130, a spatial diversity processor 150, a time diversity processor 170, and an audio data processor 184.

The automatic gain controlled amplifier 86 provides a variable voltage gain so that its output signal 88 remains substantially within the dynamic range of the analog to digital convertor 90. The analog to digital converter 90 tranforms the varying analog output signal 88 into a stream of digital words 92. The digital words 92 comprise a spectrum containing all five frequency bands received by the antenna sub-system 72 and amplified by the analog signal processor 76. The digital words 92 are processed by the digital filter 94. The digital filter 94 extracts or separates the five frequency bands from the combined spectrum stream of digital words 92. The digital filter 94 may use a fast Fourrier Transform or a simliar computational technique to extract frequency domain information from the combined spectrum time domain signal represented by the stream of digital words 92. The digital filter 94 provides a terrestrial frequency band output 96, and four satellite frequency band outputs 98. These five outputs are digital representations of the QPSK modulated data transmitted using the method 40 in FIG. 2 on each of the five frequency bands used by the system 20 in FIG. 1.

Figure 3A:
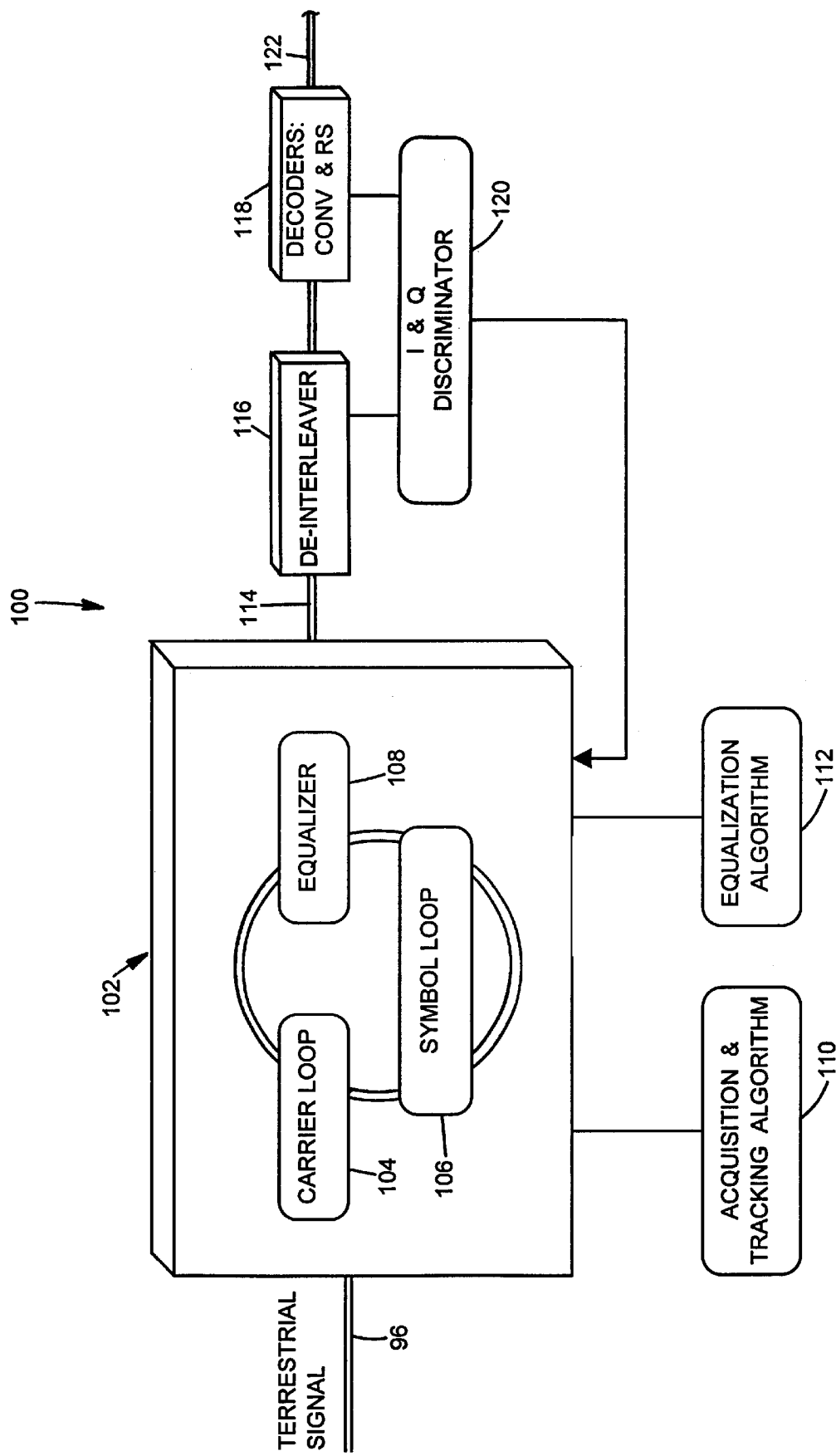
FIG. 3A is a block diagram depicting a sub-section of the proposed radio receiver that processes the frequency band used by the terrestrial repeaters.

Now with reference to FIG. 3A, the terrestrial frequency band output 96 is applied to the terrestrial signal sub-processor 100. The terrestrial signal sub-processor 100 processes the terrestrial signal 96 using an adaptive demodulator 102. The adaptive demodulator 102 comprises a carrier lock control loop 104, a symbol lock control loop 106, and an equalizer function 108. An equalization controller 112 and an aquisition and tracking contoller 110 interact with the adaptive demodulator 102, and dynamically adjust the paramters of the symbol lock control loop 106 and the carrier control lock loop 104 to optimally demodulate the terrestrial signal 96. The controllers 112 and 110 further interact with the adaptive demodulator 102 to deconvolve multi-path components from the terrestrial signal 96 by altering its phase within the adaptive demodulator 102. Deconvolving the multi-path components produces a flattened transfer function, and corrects for intersymbol interference.

The interactions of the acquisition and tracking controller 110 and the equalization controller 112 are carefully balanced to ensure a minimum signal acquisition time and to minimize the possibility of a lost lock on the terrestrial signal 96. In an urban mobile environment, better demodulation is achieved if the equalization controller 112 dominates control of the carrier lock control loop 104 and the symbol lock control loop 106 because signal reception characteristics change rapidly due to the large number of signal propagation impairments. In contrast, in a rural, or less dynamic environment, better demodulation is achieved if the tracking controller 110 dominates control of the carrier lock control loop 104 and the symbol lock control loop 106.

A demodulated terrestrial signal 114 passes through a de-interleaver 116 and a Reed-Solomon decoder 118. An in-phase/quadrature phase discriminator 120 provides feedback to the adaptive demodulator 102. A decoded terrestrial signal 122 comprises data words from the terrestrial data stream and a Reed-Solomon error flag that indicates if the blocks have been correctly decoded.

Figure 3B:
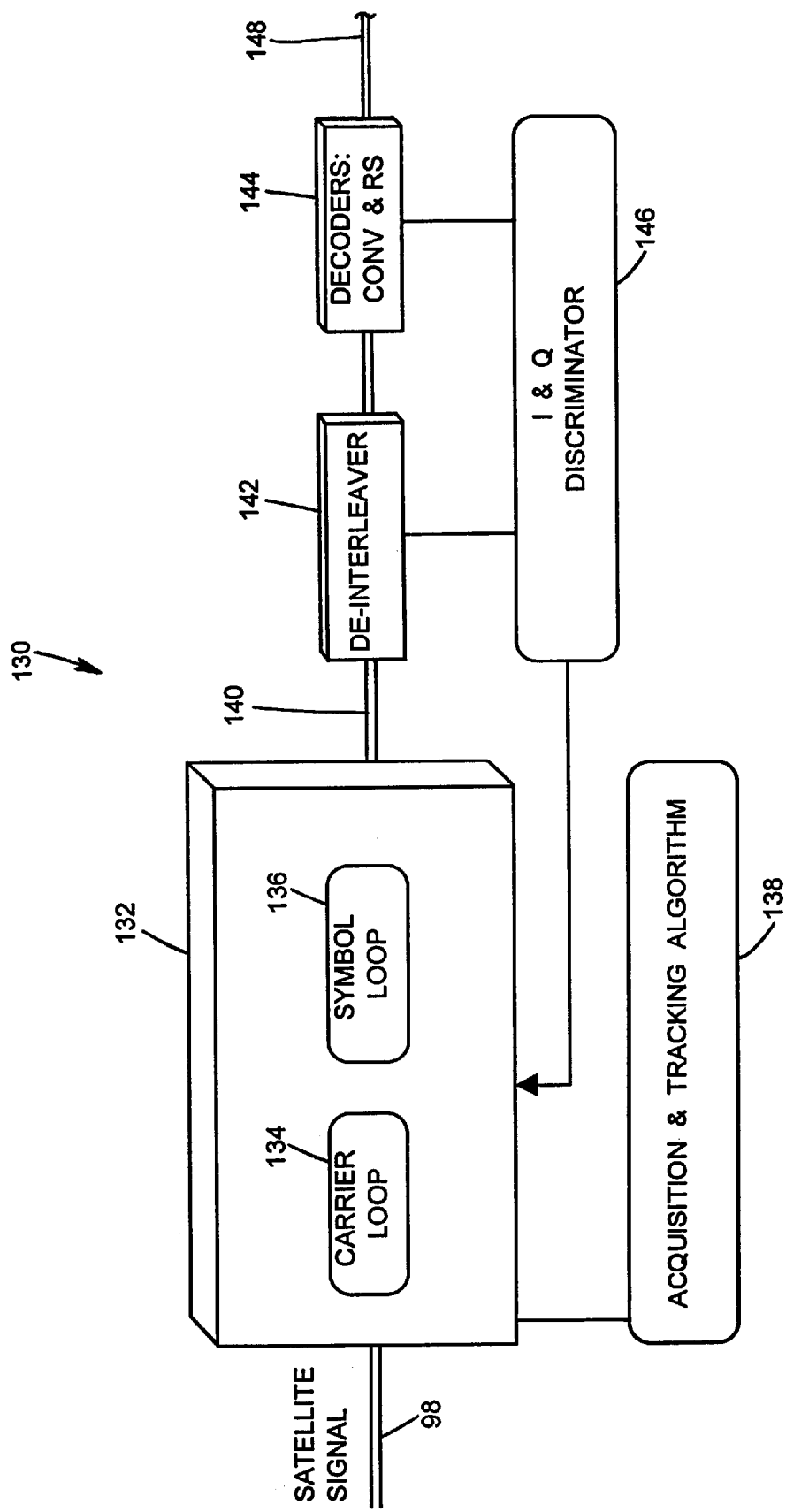
FIG. 3B is a block diagram depicting a sub-section of the proposed radio receiver that processes the frequency bands used by the satellites.

Now with reference to FIG. 3B, the satellite signal sub-processors 130 process the satellite signals 98 using an adaptive demodulator 132. The adaptive demodulator 132 comprises a carrier signal lock control loop 134 and a symbol lock control loop 136. An acquisition and tracking controller 138 interacts with the adaptive demodulator 132 to optimally demodulate the satellite signals 98.

A demodulated satellite signal 140 passes through a de-interleaver 142 and a Reed-Solomon decoder 144. An in-phase/quadrature phase discriminator 146 provides feedback to the adaptive demodulator 132. Decoded satellite outputs 148 comprise data blocks from the satellite data streams and Reed-Solomon error flags that indicate if the blocks have been correctly decoded.

Figure 3C:
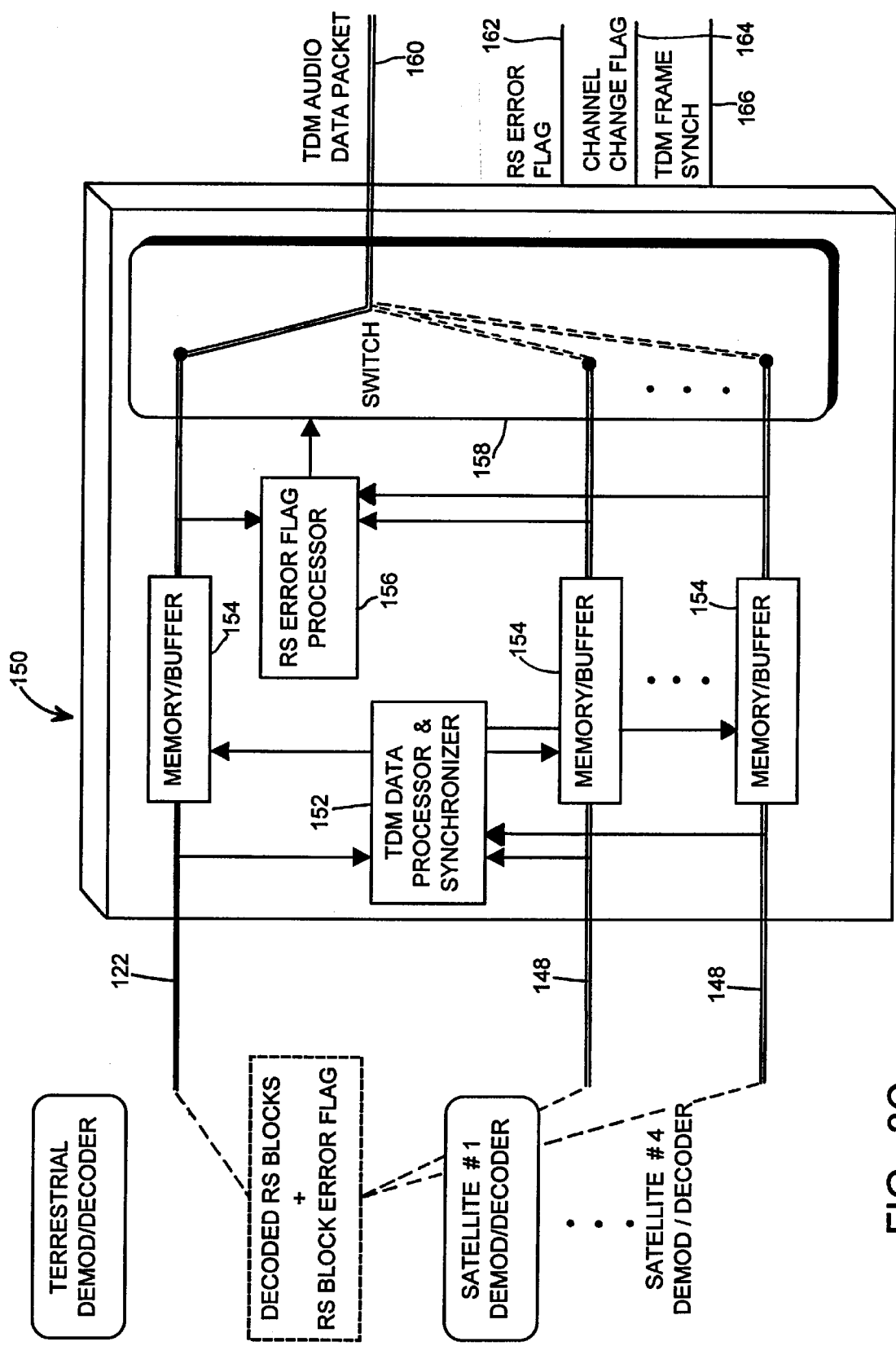
FIG. 3C is a block diagram depicting a sub-section of the proposed radio receiver that temporally aligns and selectively parses and concatenate a plurality of data streams.

Referring to FIG. 3C, the decoded terrestrial signal 122 and the decoded satellite signals 148 are applied to a spatial diversity processor 150. The spatial diversity processor 150 comprises a TDM data processor and synchronizer 152, memory buffers 154, a Reed-Solomon error flag processor 156, and a data channel switch 158. The terrestrial signal 96 and the satellite signals 98 are from spatially diverse sources. This spatial diversity results in some temporal diversity. The TDM synchronizer 152 temporally aligns the terrestrial signal 122 and the satellite signals 148, and then stores their temporally aligned data words and associated error flags in the memory buffers 154. The error flag processor 156 sequentially poles error flags for the data words that are next in the first-in first-out (FIFO) queues in the memory buffers 154. The error flag processor 156 selects a signal source presenting a data word with no errors, and routes this data word through the data channel switch 158 to the TDM audio output 160. The error flag processor 156 repeats this selection process one data word at a time and thereby concantenates as many error free data words as possible to reconstruct a seamless copy of the original TDM data stream. It should be recognized that apart from corruptions due to signal impairments, the memory buffers 154 contain substantially identical sequences of data words. If the processor 156 determines that all available data words are corrupt, an error flag 162 will be set, and a data word equivalent to a mute condition will be placed on the TDM audio output 160. The spatial diversity processor 150 further provides a channel change flag output 164 that indicates which channel has been selected for output, and a TDM frame sychronization output 166.

Figure 3D:
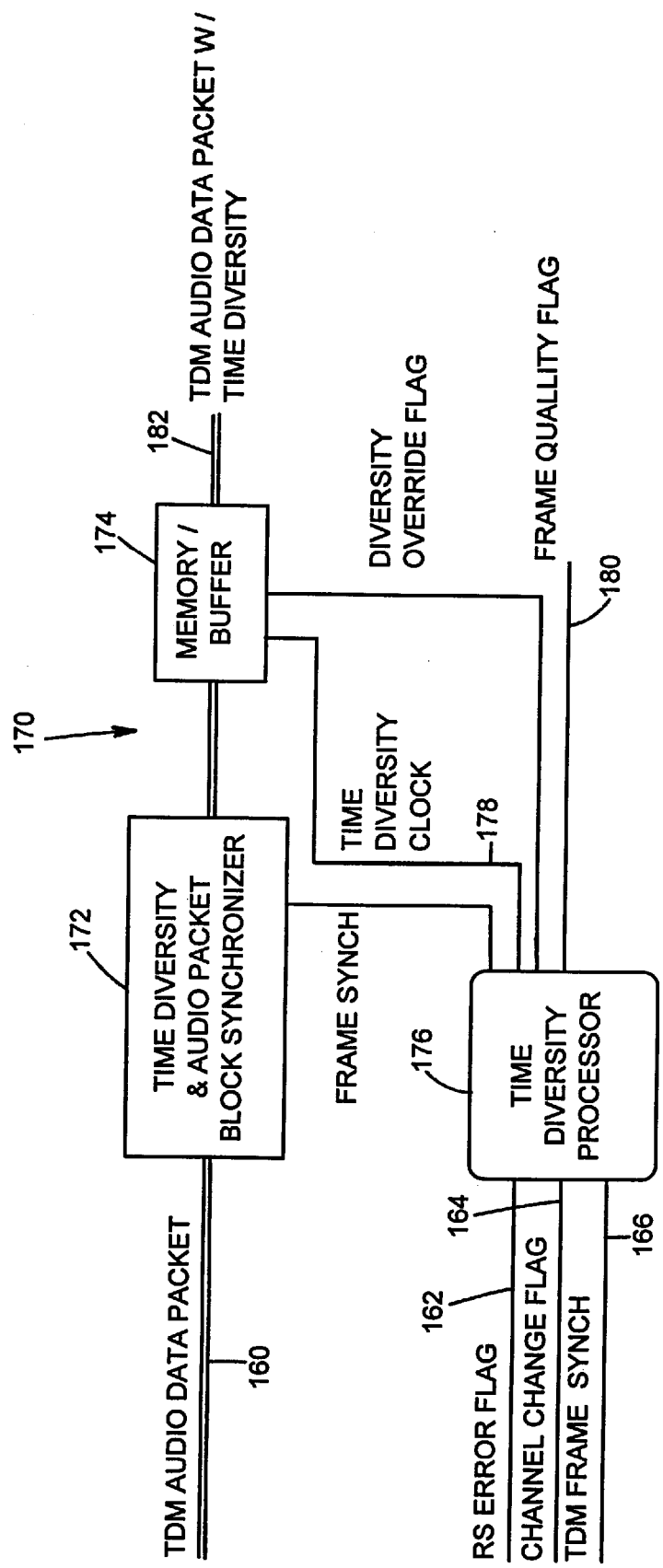
FIG. 3D is a block diagram depicting a sub-section of a the proposed radio receiver that selectively outputs a delayed copy of a data stream that is embedded within another time division multiplexed data stream.

Referring now to FIG. 3D, the TDM audio output 160, the error flag 162, the channel change flag output 164, and the TDM frame synchronization output 166 are applied to a time diversity processor 170. Time diversity processor 170 comprises an audio packet synchronizer 172, a memory buffer 174, and a time diversity controller 176. The audio packet synchronizer 172 uses the frame sychronization input 166 and a time diversity clock 178 to synchronize to the TDM data stream input 160. The TDM data stream 160 contains two copies of the same program information wherein one has been delayed approximately four seconds with respect to the other. Delay time is a direct function of the size of the memory buffer 174, and can be increased or decreased as required to accommodate anticipated signal impairment audio packet synchronizer 172 to the delayed program. In the event that the error flag 162 has been set, the time diversity controller 176 retrieves an equivalent uncorrupted portion of the leading program signal from the memory buffer 174. Thus, the time diversity processor 170 allows for the correction of a corrupted signal as long as the duration of the corruption does not exceed the delay between the two copies of the program.

Referring back to FIG. 3, the time diversity processor 170 provides a TDM audio data stream 182 to an audio data processor 184. The audio data processor 184 decommutates the individual channels from the TDM audio data stream and generates an analog audio signal 186 that is applied to an audio amplifier 188 and a speaker 190. The audio data processor 184 may also provide a digital output 192 for use in a display 194.

In summary, the disclosed invention time division multiplexes a plurality of data channels and transmits a Reed-Solomon encoded TDM data stream on five frequency bands. To maximize spatial diversity, four satellites in various earth orbits and a plurality of terrestrial repeaters each transmit the same encoded TDM data stream. Each satellite uses a unique frequency band and the terrestrial repeaters share the fifth frequency band. A mobile diversity receiver simultaneously monitors all five frequency bands. The receiver temporally aligns each of the data streams coming from the five frequency bands. The receiver further uses the Reed-Solomon error flags to selectively parse and concatenate data words from the five frequency bands to recompose a single high quality output data stream. The high quality output data stream may be an audio signal, visual display information, or a combination of audio and visual information.

Of course, it should be understood that a range of changes and modifications can be made to the preferred embodiment described above. For example, more or fewer satellites and frequency bands may be employed to achieve a similar result. It is therefore intended that the foregoing detailed description be regarded as illustrative rather than limiting and that it be understood that it is the following claims, including all equivalents, which are intended to define the scope of this invention.

What is claimed is:

1. An improved mobile digital radio system comprising:
a plurality of satellites in earth orbit that transmit substantially identical information using a plurality of frequency bands;
a plurality of terrestrial repeaters that transmit information substantially identical to that transmitted by said plurality of satellites;
a mobile receiver being adapted to simultaneously receive information transmitted from said plurality of satellites and said plurality of terrestrial repeaters, and
said mobile receiver further being adapted to selectively parse and concatenate information transmitted from said plurality of satellites and said plurality of terrestrial repeaters to substantially recompose a digital data stream.

2. A mobile digital radio receiver comprising:
a signal processor adapted to simultaneously receive information transmitted from a plurality of satellites using a plurality of frequency bands and a plurality of terrestrial repeaters; and
a digital processor adapted to selectively parse and concatenate information transmitted from said plurality of satellites and said plurality of terrestrial repeaters to substantially recompose a digital data stream.

3. The mobile digital radio receiver of claim 2 wherein said digital processor comprises an adaptive demodulator adapted to demodulate and equalize information transmitted from said plurality of satellites and said plurality of terrestrial repeaters.

4. The mobile digital radio receiver of claim 2 wherein said digital processor comprises a synchronizer adapted to temporally align independent data streams.

5. The mobile digital radio receiver of claim 2 wherein said digital processor comprises an error flag processor adapted to identify error free data words.

6. The mobile digital radio receiver of claim 2 wherein said digital processor comprises a data channel switch adapted to concatenate data words to substantially recompose a digital data stream.

7. The mobile receiver of claim 2 wherein said digital processor comprises a time diversity processor adapted to selectively output a time delayed data stream embedded within a time division multiplexed data stream.

* * * * *